July 29, 1969

J. F. EVERSOLE 3,458,248

LIGHT POLARIZING STRUCTURE AND PROCESS THEREFOR UTILIZING
CYLINDRICAL-SHAPED CAVITIES WITH IN AN ISOTROPIC SHEET

Filed Oct. 3, 1966

INVENTOR
James F. Eversole
BY
ATTORNEY

United States Patent Office 3,458,248
Patented July 29, 1969

3,458,248
LIGHT POLARIZING STRUCTURE AND PROCESS
THEREFOR UTILIZING CYLINDRICAL-SHAPED
CAVITIES WITHIN AN ISOTROPIC SHEET
James F. Eversole, 710 The Parkway,
Mamaroneck, N.Y. 10543
Filed Oct. 3, 1966, Ser. No. 583,848
Int. Cl. G02b 5/30, 27/28
U.S. Cl. 350—152                                    8 Claims The present invention relates to the polarization of light. More particularly, the invention is directed to a structure capable of increasing the degree of polarization of light, to a method for producing this structure, and to the use of the structure in increasing the degree of polarization of light. Since the product is a transparent polarizing pane it is here designated as Polarplane.

It is well known in the field of optics that light can be polarized by passage at and near the Brewster angle through stacks of glass plates spaced slightly apart, or through various mechanical structures which produce a similar alternation of media of different refractive index, for example, glass versus air. Several structures designed to polarize light or to analyze light previously polarized have also been suggested, for example, the devices described in U.S. Patents 2,017,705, 2,982,178, 3,024,701 and 3,124,639.

The devices of the above-mentioned patents and similar devices are all based on the principle of providing alternate layers of materials of different index of refraction through which a beam of unpolarized, or less than completely polarized, light must pass. Light which is incident upon such a structure at and near the so-called Brewster angle will undergo a slight degree of polarization on refraction at each interface between a medium of relatively low and relatively high refractive index. On passing through many such interfaces, high degrees of polarization of light can be effected. The devices heretofore known, however, have not been completely satisfactory in all respects, the principal disadvantages being relatively complicated structures which are difficult to produce efficiently, and which in many instances are either very bulky, rigid structures or else are so thin and flexible as to require external support for most applications.

The structure of the present invention is a self-supporting single sheet of transparent material which contains a special arrangement of shaped cavities therein such that light passing through the structure undergoes extensive polarization. The structure of this invention is produced by a process in which a sheet of transparent material containing bubbles of material having refractive index different from that of the solid material is biaxially deformed, as by stretching.

Figure 1:
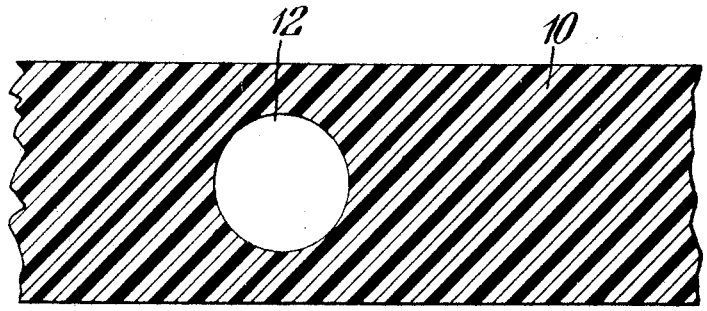
Figure 2:
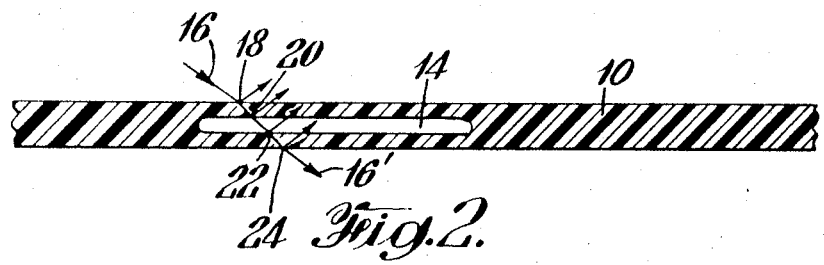
Figure 3:
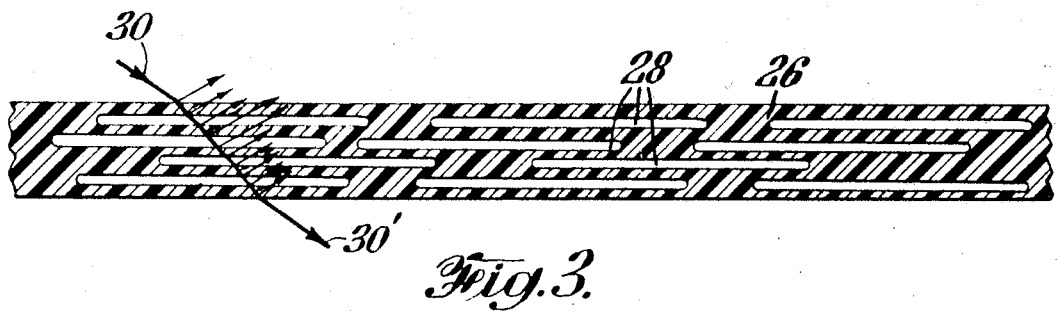
Figure 4:
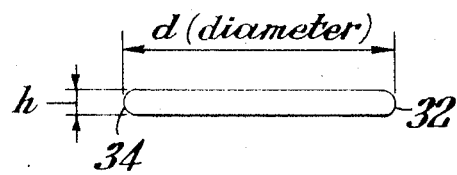
Figure 5:
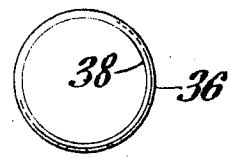

In the drawings:
FIGURE 1 is a sectional view of a portion of a sheet of transparent material containing a single bubble prior to deforming by the process of this invention.
FIGURE 2 is a sectional view of the sheet of FIG. 1 after deformation by stretching.
FIGURE 3 is a sectional view of a light polarizing material of this invention illustrating the arrangement of cavities and the path of a light ray passing through the sheet.
FIGURE 4 is a sectional view of a single cavity and showing the dimensions on which eccentricity calculations are based.
FIGURE 5 is a projection on a plane surface of the cavity of FIG. 4.

The light polarizing structure of this invention comprises a generally flat sheet of transparent substantially isotropic solid material having disposed therein numerous cavities containing transparent fluid material of different index of refraction from that of the solid material, the cavities being generally near-cylindrical in shape with a diameter to altitude ratio (eccentricity) of at least 10 and with bases which are substantially flat and parallel to each other and which lie generally parallel to the plane of the sheet of solid material. The altitudes of the near-cylindrical cavities are generally parallel with one another and the altitudes are generally perpendicular to the plane of the flat sheet of transparent solid material. The cavities within the solid sheet are sufficiently numerous so that light passing through the sheet traverses on the average at least 10 fluid-solid interfaces. The density of the solid material, including the cavities, is at least 20% of the density of the solid material, thus providing the sheet with sufficient rigidity and strength to be self-supporting over useful areas.

Based on theoretical calculations, polarization of light at an interface takes place only if the thickness of the medium entered by the light is at least greater than ¼ wave length of light. In practice, however, greater thickness is desirable and in the light polarizing structure of the present invention, the majority of the cylindrical cavities have altitudes of at least one micron, and the cavities are separated from one another by sections tof solid material which are at least one micron thick.

The process of this invention comprises the steps of providing a substantially isotropic transparent solid material which can be biaxially deformed and which contains within the solid material numerous bubbles of a fluid of different refractive index from the solid material; and thereafter deforming the sheet of the solid material biaxially until the fluid-containing cavities therein are deformed to assume the near-right cylindrical shape and orientation described above.

The structures and process of the invention are further illustrated in the drawings.

FIGURE 1 is a sectional view of a portion of a sheet of transparent isotropic solid material 10 prior to biaxial deformation. The portion of the sheet 10 contains a substantially spherical bubble 12 (also shown in cross-section in the drawing) of fluid material of different refractive index.

FIGURE 2 shows the same cross-sectional view of the same portion of transparent isotropic solid material 10 after biaxial deformation. The bubble which was substantially spherical in shape prior to deformation now is in the form of a substantially right cylindrical cavity 14, also shown in cross-section in FIGURE 2. The path of a light beam through the deformed sheet is shown by the large arrows 16, 16′. Light following the path 16, 16′ traverses four different interfaces between media of relatively low or relatively high refractive index, that is, the interface at 18 is between air and the transparent isotropic solid material, the interfaces at points 20 and 22 are between the transparent isotropic solid material and the fluid in cavity 14, and the interface at point 24 is between the transparent isotropic solid material and air.

FIGURE 3 shows a more detailed sectional view of one of the light polarizing structures of the present invention. In FIGURE 3 the biaxially deformed solid sheet 26 contains numerous substantially right cylindrical cavities 28 produced by biaxial deformation of a sheet of solid material containing generally spherical cavities. Light passing through the structure of FIGURE 3 generally follows the path 30, 30′ and traverses ten interfaces between the transparent isotropic solid material and fluids of differing refractive index. At each of the interfaces some increase in the degree of polarization of the transmitted light results, due to reflection of part of the unpolarized beam in the form of light polarized at an angle of 90° to the transmitted light. This reflected light is shown by the small arrows in FIGURE 3. Thus, the light emerging at 30' is decreased in intensity from light entering at 30, but has a much higher degree of polarization than the unpolarized light 30 incident upon the structure of this invention. It is understood that the incident light represented by arrows 16 in FIGURE 2 and 30 in FIGURE 3 strikes the plane surface of the solid isotropic material at or near the Brewster angle.

In theory, an individual light beam which emerges with 100% polarization would have only 50% of its initial intensity, the remainder having been lost in polarizing reflections. In practice, some of the reflected light (small arrows in FIGS. 2 and 3) is again reflected at surfaces within the structure of this invention and eventually emerges as useful light with increased degree of polarization over the incident light. A depolarizing reflector can also be used to redirect reflected light back through the polarizing structures of this invention. Such reflectors are described in U.S. Patent 2,402,176. Thus, the structures of this invention provide useful increases in the degree of polarization of light while still maintaining greater than 50 percent of the initial intensity of the unpolarized (or less than completely polarized) light.

Suitable starting materials for the process of this invention include any substantially isotropic light transparent material whose physical properties permit it to be formed into generally flat sheets and thereafter biaxially deformed. The solid material must also be capable of retaining within its structure numerous cavities or bubbles of material of refractive index different from that of the solid material. The solid material must be substantially isotropic in order to avoid development of undesirable degrees of birefringence. Typical solid materials useful in this invention include many forms of conventional glass and transparent plastic materials such as polystyrene, polymethylmethacrylate, polyvinylchloride, polyvinylidenechloride, polyperfluorethylene, and the like. All of these materials are capable of retaining within their structural bubbles of fluid substances of different index of refraction from their own index. Practically any transparent fluid can be used to form the cavities in the transparent solid material. Gases are generally preferred because of their low (close to unity) refractive indices, but water and transparent organic liquids are also satisfactory. Preferably the indices of refraction of the solid material and the fluid should differ by at least 10 percent. Typical solid materials containing fluid bubbles which are useful in this invention include glass containing air bubbles, polystyrene containing air, steam or propane bubbles, and polyvinylchloride containing methylene dichloride bubbles.

Synthetic polymeric materials containing absorbed fluids of the type conventionally used to produce plastic foams are not satisfactory for use in this process because such materials contain excessive amounts of fluid and when heated expand to give foam type products whose density is only a few percent (0.75 to 3.0%) of the theoretical density of the solid plastic. In these low density foams two intolerable conditions are encountered, as follows. First, the products are so light and mechanically fragile that they are unserviceable over useful areas unless they are made very thick, in which case only a small percentage of the incident light will penetrate the body; and second, in these low density products the cavities do not have the shapes of the cavities of this invention as illustrated in FIGS. 1 to 4. Instead of having sphere and deformed-sphere shapes they have close packed polyhedral shapes, ideally close peaked regular dodecahedra in the unstretched condition, involving only plane faces held at fixed angles to each other, with only occasional faces parallel to the plane of the sheet. When these products are stretched, for example, by a method similar to the process of this invention, the polyhedral structure is retained by the deformed cavities and only a low degree of polarization can be realized. In such a structure, scattering by the many faces which are improperly positioned dominates the performance to give mostly scattering and absorption of light with little polarization.

Suitable choice of starting material for use in the process of this invention can be easily made, however, in view of the density and cavity spacing requirements outlined above. It has been pointed out that commercial foam products are not suitable. Frequently these commercial products are made by extrusion of commercial "expandable" beads of plastic which contain absorbed "blowing agents" such as propane, methylene dichloride, etc. These same beads are available which have no blowing agent and which are used in the extrusion of solid plastic shapes. Proper blending of these two bead materials before feeding to the extruder will give products of any desired density on discharge from the high pressure zone of the extruder thus producing the materials of 20 to 95% or more density specified as the range for Polarpane products of this invention. The mixing action in the barrel of the screw extruder delivers an extrudate having excellent bubble distribution. Furthermore, the severe shearing action in the extruder will "tear apart" any large bubbles, so that the bubble size range for a given mix is reasonably uniform and quite satisfactory for producing the light polarizing structures of this invention. Also this last feature makes it possible to use 100% non-expandable beads, with metered air, steam or other fluid injection into the extruder barrel at the proper point to give the desired degree of expansion in the product on release from the high temperature-pressure zone of the extruder at the extrusion die. Thus, standard operations in a wide variety of choice are usable to meet the wide range of physical property choices possible in the invention.

In connection with the choice of starting material, it should be noted that the greater the difference in refractive index between the transparent solid material and the fluid material forming the cavities, the greater will be the amount of polarization of the light beam with each passage from the medium of one refractive index to the medium of differing refractive index. Choice of air or vapor bubbles (refractive index 1.0) versus plastics (index usually above 1.5) or glass (index usually above 1.6) as is involved in structures of this invention is obviously far superior to plastics versus glass as specified in many of the structures of the prior art as exemplified by the patents referred to hereinabove.

In carrying out the process of this invention the solid material containing bubbles of fluid material can be formed into generally flat sheets by any convenient method, for example, by the extrusion of a flat sheet, or by extrusion of a tube. In either case the extrudate will expand on release of pressure at the extrusion die, giving a sheet like product which has suitable properties.

The starting material in the form of a flat sheet or tube contains bubbles of fluid material which are substantially spherical when operating in the range of density of 20% or above as called for in this invention. The sheet or tube containing the spherical bubbles is then deformed biaxially to flatten the bubbles into near-right cylindrical shape cavities as described previously, thus producing the light polarizing structure of this invention. The step of biaxial deformation can be carried out by conventional methods which include, for example, stretching by use of tentering type of equipment for flat sheets, and blown-bubble type equipment for stretching a tube, both of which are standard continuous operations.

In the tentering type process flat sheets are produced directly; they need only edge trimming and cutting to size for use. The cheaper blown bubble process may be operated so that flat sheets are produced at the pinch rolls which retain the bubble, which is the usual method, or it may be operated to produce large diameter tube sections. Pieces cut from such tube sections are curved in one direction, more or less depending on the diameter of the blown bubble. Such pieces can be flattened if desired by clamping them in a rigid frame and warming; the sheet will tend to shrink removing the curvature. Similarly, reasonable "edge contour" shapes for the mounting of panels can be introduced by conventional vacuum forming procedures.

No special techniques are necessary in the biaxial deformation step to obtain the cavity shape and distribution which characterizes the light polarizing structures of this invention. The transformation of spherical bubbles into near-right cylindrical cavities of the type described results automatically from biaxial deformation of the degree to be discussed below in greater detail. The volumes of the bubbles, and hence the density of the product, remain substantially constant during the biaxial deformation process, only the shape and orientation of the bubbles being changed.

The amount of deformation should be such that each of the two perpendicular axes (lying in the plane of the sheet to be stretched) is increased by a factor of at least two. As used herein the term "degree of deformation" refers to the amount that each axis of the plane flat sheet is elongated during the deformation step. Thus, a degree of deformation of four means that each perpendicular axis lying in the plane of the sheet is increased by a factor of four, the area of the deformed sheet then being sixteen times the area of the undeformed sheet. Ideally, the degree of deformation should be the same in both directions, but in practice it is found that variation of 30% is easily permissible provided the minimum deformation is two times or more.

It has been found that a degree of deformation of two is adequate to produce the near-right cylindrical cavities which characterize the structures of this invention. With a degree of deformation less than about two, the cavities tend to retain too much of their initial spherical shape with the result that the upper and lower surfaces of the cavities are not near-planar and are not sufficiently parallel with each other and with the surface of the sheet, so that an undesirable amount of light scattering takes place as the light beam penetrates the structure.

Regardless of the degree of deformation, the "vertical" walls of the generally right cylindrical cavities will tend to retain a high degree of curvature as is illustrated in FIG. 4. The curved portion of the cavities tend to produce scattering rather than polarization of light passing through. The magnitude of the light scattering effect can be illustrated in terms of the projected area of the curved portion versus the total projected area of curved and flat portion when the two areas are projected onto a plane surface. The curved annular portion of the cavity shown in cross-sectional view in FIGURE 4 is indicated generally by the numerals 32 and 34. When the cylindrical cavity, as represented in FIGURE 4, is projected perpendicular to its diameter upon a plane surface, the projection appears as a circle as is shown in FIGURE 5. The projection of the curved annular portion is then represented by the area between the outer circle 36 and the inner circle 38 in FIGURE 5. The ratio of the diameter of the cylindrical cavity (designated $d$ in FIG. 4) to the altitude of the cylindrical cavity (designated $h$ in FIG. 4) is herein defined as the eccentricity of the cavity. It will be seen that as the eccentricity of the cavity increases the projected annular area represents a smaller and smaller percentage of the total area of the base of the cylindrical cavity and, accordingly, the greater the eccentricity the smaller will be the undesirable light scattering effect of the curved cylindrical walls. This relationship is illustrated in Table A which demonstrates the relationship between the degree of biaxial deformation, the eccentricity of the resulting cylindrical cavities, and the percentage of the total area of the cylinder base which is covered by the projection of the curved annular area.

TABLE A

| Degree of deformation | Eccentricity | Percent projected annular area |
|---|---|---|
| 1.5 | 5 | 36 |
| 2.0 | 12 | 13.1 |
| 2.35 | 19 | 10.0 |
| 2.9 | 39 | 5.0 |
| 4.0 | 100 | 2.0 |
| 8.0 | 800 | 0.25 |
| 16.0 | 6,400 | 0.03 |

Thus, it has been found that with a degree of deformation of about two, the projected annular area is only about 13% of the cylinder base area and that under these conditions the structures of the present invention provide useful degrees of polarization of light passing through them. Preferably, for a high quality product giving relatively high degrees of polarization it is necessary to go to higher deformation and eccentricity, choosing these to give the product required. For the higher quality products a degree of deformation of at least 3 and a corresponding eccentricity of about 40 will be required. In connection with the above discussion, it has been found that the eccentricity of the cylindrical cavity is essentially independent of the bubble diameter in the deformed sheet, and that the eccentricity essentially varies only with the degree of deformation.

In the light polarizing structures of this invention, substantial polarization of unpolarized light is obtained when the light passing through the structure undergoes at least ten penetrations, that is, at least ten passages across interfaces between material of relatively high and relatively low refractive index. Preferably, the light should undergo at least 40 such penetrations, and structures of this invention have been prepared in which the light undergoes more than 100 such penetrations in traversing the thickness of the structure. There is thus a wide latitude for choice, depending only on the quality of product required for a given end use.

By the processes herein described one can make the full range of quality of product as far as degree of polarization of the transmitted light is concerned. In order to define the quality description terms used, the following tabulation indicates the approximate degree of polarization involved in each class, with an estimate of the number of penetrations across interfaces between high and low refractive index materials required to give the specified polarization, assuming the air-polystyrene system.

TABLE B

| Quality designation | Percent polarization | Approximate number of penetrations |
|---|---|---|
| Poor | 0.0–30 | 0.0–25 |
| Fair | 30–60 | 25–50 |
| Good | 60–85 | 50–90 |
| Excellent | 85–99 | 90–200 |

Quality of product will vary primarily with the average number of cavities penetrated by the beam in traversing through the sheet. A second important factor is the degree of biaxial deformation involved; higher eccentricity contributes to higher degree of polarization. Higher eccentricity also serves to minimize the percentage of light scattered (rather than reflected or transmitted) and thus makes an important contribution to the efficiency of the structures of this invention.

The structures of this invention are useful in increasing the degree of polarization from any light source which produces (at least in part) unpolarized light. For example, the degree of polarization of light emanating from the sun, incandescent electric light bulbs, carbon arcs, fluorescent lights, and the like, can be increased by passing such light through one or more of the light polarizing structures of this invention.

The following examples further illustrate the process and structure of this invention. In the examples the transparent isotropic solid material was purchased commercially in the form of polystyrene beads containing absorbed pentane as a blowing agent. The beads, as purchased, were unsuitable for use in this invention because the pentane content was too high and would have, if heated, produced only low density foams. In order to reduce the pentane content to a satisfactory level for this work the commercial beads were heated in an open vessel for periods of 24 hours or more at temperatures above 50° C. before use. Measured amounts of these beads were then placed in a confining mold of fixed volume, and heat applied. The heat caused the mass to expand to fill the mold, and thus produced a flat sheet suitable for subsequent biaxial stretching. Selection of the amount of plastic material used as compared with the volume of the mold allowed predetermination of the density of the product. After heating, the mold was cooled and the flat sheet product, a "preform," was removed. The preforms were then biaxially stretched by mounting in a suitable jig, warming to get plasticity, and stretching. Jigs for both flat sheet stretching and spherical bubble stretching were used successfully.

In Example 1, detailed illustrative data is given as to the characteristics of the spherical bubbles, the degree of deformation, the size and shape of the cylindrical cavities in the final product, and the like.

In the examples, the percent densities are based on the theoretical density of solid polystyrene.

EXAMPLE 1

A preform sheet 11.5 mm. thick containing about 53,000 bubbles per cc. of average diameter 0.25 mm. was biaxially stretched 2.4 times and cooled in the stretched condition to produce a structure of this invention 2 mm. thick having sufficient cylindrical (disc shaped) cavities to give an average of 30 penetrations of a light beam, and having fair efficiency as a polarizer and excellent mechanical strength with its 57% density.

Data.—Eccentricity 20; sphere diameter 230 microns ($\mu$); stretch 2.4×; disc dia. 0.60 mm.; disc area 0.283 sq. mm.; 30 penetrations 10,600 discs under 1 sq. cm. of surface; bubble volume 0.0081 cu. mm.; disc height 29$\mu$; for number of spheres under 1 sq. cm. (unstretched) 10,600 ×2.4²=61,000; 10,600×0.0081=86 cu. mm. disc volume under 1 sq. mm. of surface. At 2.0 mm. thick sheet (200 sq. mm. under one sq. cm. of surface) the density is [(200 −86)/200]×100=57% density of final product; 2×2.4² =11.5 mm. thickness of unstretched sheet. 10% projected annulus area; fair efficiency as a polarizer.

EXAMPLE 2

A preform sheet 8.6 mm. thick containing 1.8 million bubbles per cc. of average diameter of 50$\mu$, was biaxially stretched 2.93 times and solidified in the stretched condition to produce a structure of this invention 1 mm. thick having sufficient cylindrical cavities to give 30 penetrations of a light beam, and having fair polarizing efficiency and excellent mechanical strength due to its 88% density.

EXAMPLE 3

A preform sheet 94 mm. thick containing bubbles per cc. of average diameter 1.3 mm. was biaxially stretched 8.5 times and solidified by cooling to produce a structure of this invention 1.3 mm. thick and having sufficient cylindrical cavities to give 80 penetrations of a light beam. The product structure was a good high efficiency polarizer with density of 26% and satisfactory mechanical properties.

EXAMPLE 4

A preform sheet 37 mm. thick containing 56,000 bubbles per cc. of average diameter 0.25 mm. was heated and biaxially stretched 8.6 times and solidified in the stretched condition to produce a structure of this invention 0.5 mm. thick and having sufficient cylindrical cavities to give 100 penetrations of a light beam, excellent efficiency in polarization, and high mechanical strength due to its 55% density.

EXAMPLE 5

A preform sheet 9.6 cm. thick containing 1330 spherical bubbles per cc. of average diameter 1.0 mm. was heated and biaxially stretched 8.6 times and solidified to produce a structure of this invention 6 mm. thick and having sufficient cylindrical cavities to give 100 penetrations of a light beam. The product structure gave excellent polarization and had adequate mechanical strength for the relatively low density of 30%.

EXAMPLE 6

A preform sheet 1.6 cm. thick containing about 15,000 spherical bubbles per cc. of average diameter 0.10 mm. was biaxially stretched four times and solidified to produce a structure of this invention 1.0 mm. thick and having sufficient cylindrical cavities to give 30 penetrations of a light beam, poor to fair polarizing efficiency, and excellent mechanical properties due to its high density of 87.5%.

EXAMPLE 7

A preform sheet 3.2 cm. thick containing 67,000 spherical bubbles per cc. of average diameter 0.25 mm. was heated and biaxially stretched four times and solidified by cooling, to produce a structure of this invention 2 mm. thick and having sufficient cylindrical cavities to give 100 penetrations of a light beam, a density of 49%, and excellent polarizing properties and mechanical properties.

What is claimed is:

1. A light polarizing structure which comprises a generally flat sheet of transparent substantially isotropic solid material and numerous cavities containing transparent fluid material of different refractive index from said solid material disposed within said solid material, said cavities being generally cylindrical in shape with a diameter to altitude ratio of at least about 10, and having bases which are substantially flat and generally parallel to each other and which lie generally parallel to the plane of said sheet of solid material and having altitudes which are generally parallel to one another and are generally perpendicular to the plane of said sheet of solid material, the majority of said cavities having altitudes of at least 1 micron and being separated from one another by sections of said solid material at least 1 micron thick, said cavities being sufficiently numerous so that light passing through said sheet traverses on the average at least ten fluid-solid material interfaces, and the density of said cavity-filled sheet being at least 20% of the theoretical density of said solid material.

2. The structure in accordance with claim 1 wherein said cavities have a diameter to altitude ratio of at least about 40.

3. The structure in accordance with claim 1 wherein said cavities are sufficiently numerous so that light passing through said sheet transverses on the average at least 40 fluid-solid material interfaces.

4. A process of producing the light polarizing structure defined in claim 1 which comprises providing a substantially isotropic transparent solid material having disposed therein numerous bubbles of a transparent fluid of different refractive index from said solid material, forming said bubble filled solid material into a flat sheet, biaxially deforming said sheet, and thereafter solidifying said sheet in the deformed condition, the degree of biaxial deformation being at least two, and the number of bubbles in said transparent material and the degree of deformation being such that in said solidified biaxially deformed sheet light passing through said sheet traverses on the average at least ten fluid-solid material interfaces, the majority of said cylindrical cavities produced from said bubbles by said deformation step have altitudes at least 1 micron, and said cavities are separated from each other by sections of solid material at least 1 micron thick.

5. The process in accordance with claim 4 wherein the degree of biaxial deformation is at least three.

6. The process in accordance with claim 4 wherein said solid material is glass, polymethylmethacrylate or polystyrene.

7. The process in accordance with claim 4 wherein said bubble-containing material is polystyrene having pentane bubbles disposed therein.

8. A process for increasing the degree of polarization of light which comprises passing less than completely polarized light through the structure of claim 1 at and near the Brewster angle.

References Cited

UNITED STATES PATENTS 3,124,639   3/1964   Kahn _____ 350—152

DAVID SCHONBERG, Primary Examiner

P. R. MILLER, Assistant Examiner

U.S. Cl. X.R.

240—9.5; 264—2; 350—156